(12) United States Patent
Rouillard et al.

(10) Patent No.: US 11,517,808 B2
(45) Date of Patent: Dec. 6, 2022

(54) PLAYING CARD DEALING SHOE ACTIVATION DEVICE

(71) Applicant: The United States Playing Card Company, Erlanger, KY (US)

(72) Inventors: Carol Rouillard, Loveland, OH (US); Kory Gunnerson, Cincinnati, OH (US)

(73) Assignee: The United States Playing Card Company, Erlanger, KY (US)

(*) Notice: Subject to any disclaimer, the term of this patent is extended or adjusted under 35 U.S.C. 154(b) by 640 days.

(21) Appl. No.: 16/090,927

(22) PCT Filed: Apr. 5, 2017

(86) PCT No.: PCT/US2017/026098
§ 371 (c)(1),
(2) Date: Oct. 3, 2018

(87) PCT Pub. No.: WO2017/176858
PCT Pub. Date: Oct. 12, 2017

(65) Prior Publication Data
US 2019/0105554 A1    Apr. 11, 2019

Related U.S. Application Data

(60) Provisional application No. 62/318,881, filed on Apr. 6, 2016.

(51) Int. Cl.
*A63F 1/18* (2006.01)
*A63F 1/02* (2006.01)
(Continued)

(52) U.S. Cl.
CPC .............. *A63F 1/18* (2013.01); *A63F 1/02* (2013.01); *A63F 1/14* (2013.01); *G06K 19/07* (2013.01);
(Continued)

(58) Field of Classification Search
CPC ...... A63F 1/12; A63F 1/14; A63F 1/18; A63F 1/02; A63F 2009/242; A63F 2009/2489; G06K 19/07
(Continued)

(56) References Cited

U.S. PATENT DOCUMENTS

6,527,191 B1 *  3/2003  Jannersten ............... A63F 1/02
                                              235/462.01
8,657,287 B2 *  2/2014  Krishnamurty .......... A63F 1/18
                                              273/149 R
(Continued)

*Primary Examiner* — Michael D Dennis
(74) *Attorney, Agent, or Firm* — Husch Blackwell LLP (57) ABSTRACT

A system including a deck of playing cards. A randomly generated number is printed on each playing card in the deck. An activation device is also provided, which contains a data file of each randomly generated number of the playing cards in the deck, and the order of each playing card in the deck. A playing card dealing shoe is also provided. The shoe includes a sensor for detecting the randomly generated number on a playing card as the playing card is drawn from the shoe. The shoe is associated with a processor, which is in communication with the sensor and the activation device to receive information therefrom. The processor determines whether a playing card drawn from the shoe is expected based on the information from the sensor and the activation device, and disables the shoe when the drawn playing card is not the expected playing card.

11 Claims, 4 Drawing Sheets

(51) Int. Cl.
*A63F 1/14* (2006.01)
*G06K 19/07* (2006.01)
*A63F 9/24* (2006.01)

(52) U.S. Cl.
CPC . *A63F 2009/242* (2013.01); *A63F 2009/2455* (2013.01); *A63F 2009/2489* (2013.01)

(58) Field of Classification Search
USPC .................................................... 273/148 A
See application file for complete search history.

(56) References Cited

U.S. PATENT DOCUMENTS

| | | | | |
|---|---|---|---|---|
| 8,920,229 | B1* | 12/2014 | Chun | A63F 1/06 463/16 |
| 9,855,491 | B2* | 1/2018 | Shigeta | A63F 1/12 |
| 10,843,064 | B1* | 11/2020 | Rivera | A63F 7/305 |
| 2007/0187266 | A1* | 8/2007 | Porter | B42F 7/025 206/459.5 |
| 2007/0225055 | A1* | 9/2007 | Weisman | A63F 1/14 463/11 |
| 2009/0048026 | A1* | 2/2009 | French | G07F 17/3232 463/47 |
| 2009/0264200 | A1* | 10/2009 | Schwartz | A63F 9/24 463/40 |
| 2011/0130185 | A1* | 6/2011 | Walker | G07F 17/3202 463/13 |
| 2014/0364240 | A1* | 12/2014 | Leyland | A63H 3/003 463/43 |
| 2015/0042042 | A1* | 2/2015 | Shigeta | A63F 1/062 273/148 R |
| 2015/0265908 | A1* | 9/2015 | Shigeta | A63F 1/18 273/149 R |
| 2016/0287998 | A1* | 10/2016 | Kawanabe | A63F 9/24 |

* cited by examiner

PLAYING CARD DEALING SHOE ACTIVATION DEVICE

CROSS REFERENCE TO RELATED APPLICATIONS

This application is a U.S. National Phase Application of International Application No. PCT/US17/26098 filed on Apr. 5, 2017, said application claims priority to U.S. Provisional Patent Application No. 62/318,881, filed Apr. 6, 2016 titled PLAYING CARD DEALING SHOE ACTIVATION CARD. The disclosures of International Application No. PCT/US17/26098 and U.S. Provisional Patent Application No. 62/318,881 are incorporated herein by reference.

FIELD OF INVENTION

The present disclosure relates to playing card dealing shoes for use in casinos, and more particularly to an activation device for use in the playing card dealing shoe.

BACKGROUND OF INVENTION

Security of playing cards is a major concern for casino properties. From leaving the factory to destruction, there are various methods and scams used to gain information on or tamper with cards to defraud casinos, causing massive financial losses. Damage to the brands of both the casino and the playing card manufacturer also occurs when these losses occur.

Players use any perceived instance of breach of game integrity to request money from a casino. Gaming regulatory agencies may also institute penalties against a casino for a breach of game integrity.

Playing card manufacturers use various coding, packaging, storage and tracking means to ensure integrity throughout the manufacturing process. Examples include using random number generators to randomly shuffle cards together so the casino doesn't have to.

Casinos use various procedures to try and ensure the security and integrity of the playing cards using a combination of human beings, machinery and procedures. Every interaction with human beings actually creates an additional point of risk in the case of unscrupulous individuals; and a point susceptible to human error or oversight. Procedures rely on human intervention and control, so provide limited security. Machinery, such as automated deck checkers and shufflers are also susceptible to failure and introduce human intervention.

This invention eliminates the security risks that occur throughout the playing card value chain. One example is the ability for cards to be replaced and/or reordered in the pack without the casino's knowledge. The invention also prevents a card from being used more than once or from being transferred from one pack or table and used on another. The invention also eliminates the need for expensive and labor intensive management of cards before and after game play and the need for physical destruction of them.

SUMMARY OF THE INVENTION

By using known methods of printing individual playing cards, applying unique individual identifiers, storing, encrypting and reading data together in a unique way with electronic table gaming devices such as dealing shoes and automatic shufflers, security can be ensured. The concepts disclosed herein can be applied to deck sizes containing any number of cards, including but not limited to deck sizes of 52, 104, 208, and up to 520 or more.

Individual cards receive a unique mark or code referred to as a serial code, allowing each to be tracked thru multiple systems both in manufacturing and game play. The unique individual identifiers could be numbers, letters, bar codes, QR codes, 2D or 3D codes or any other marks to make each card unique. The individual identifiers can be stand alone or can be combined with other information that is desired such as card rank and suit, casino property, card color or design, production details etc.

The individual identifiers on each card are read as the cards are assembled into the decks. The various identifiers are captured to a data source and encrypted into a deck identification number, code or mark, and associated file. The encryption can be done via a private key (Kpriv). There are multiple methods or algorithms for encryption, including but not limited to AES256 and SHA256. The deck identification file or data is then associated with the physical deck of cards using a smart card, RFID chip, SD card, or any other electronic data storage device or file. For example, a dual-interface card, a contactless card, a CR-80 8-pin card, a SIM/SAM card, or a keychain card may be used. This is referred to as the activation device. The activation device will be discussed herein in the context of a data card, although it should be recognized that other forms of activation devices could be used.

The data card travels with the deck of cards. It could be inside the deck in the form of a cut card or special card, or in or on the pack in any manner. Once at the casino, the data card is queried by a central server, or a device at the point where integrity of the cards needs to be verified. Such points could include an inventory management scanner, dealing shoe, shuffler, storage device or other piece of equipment.

When encrypted, the data card file is queried using a Device Key (Kdev). The device key works to read the data and determine if a match to the expected information exists. As cards are examined or read by a device such as a playing card dealing shoe, there is a check for the individual identifiers and the data card is queried to validate a match. If a match is not found, the device would stop, lock, alarm, send a signal or alert or the like to indicate a mismatch. Thus, as each card is pulled, the system verifies the information on the playing card to a matching serial number from the data card before the value of the card is considered or identified by the device.

For additional security the data card can be set to read each individual serial code only once to ensure the cards can only be used once. However, if cards are to be reused, the card deactivation features can be adjusted accordingly. For yet another level of security, the data card can contain the exact sequence of the deck.

A casino may destroy the data card or the device may erase the data card, making the reading of the associated playing cards by the device impossible.

DESCRIPTION OF THE DRAWINGS

For a better understanding of the various embodiments of the present invention, reference may be made to the accompanying drawings in which.

While the disclosure is susceptible to various modifications and alternative forms, a specific embodiment thereof is shown by way of example in the drawings and will herein be described in detail. It should be understood, however, that the drawings and detailed description presented herein are not intended to limit the disclosure to the particular embodiment disclosed, but to the contrary, the intention is to cover all modifications, equivalents, and alternatives falling within the spirit and scope of the present disclosure as defined by the appended claims.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

Figure 1:
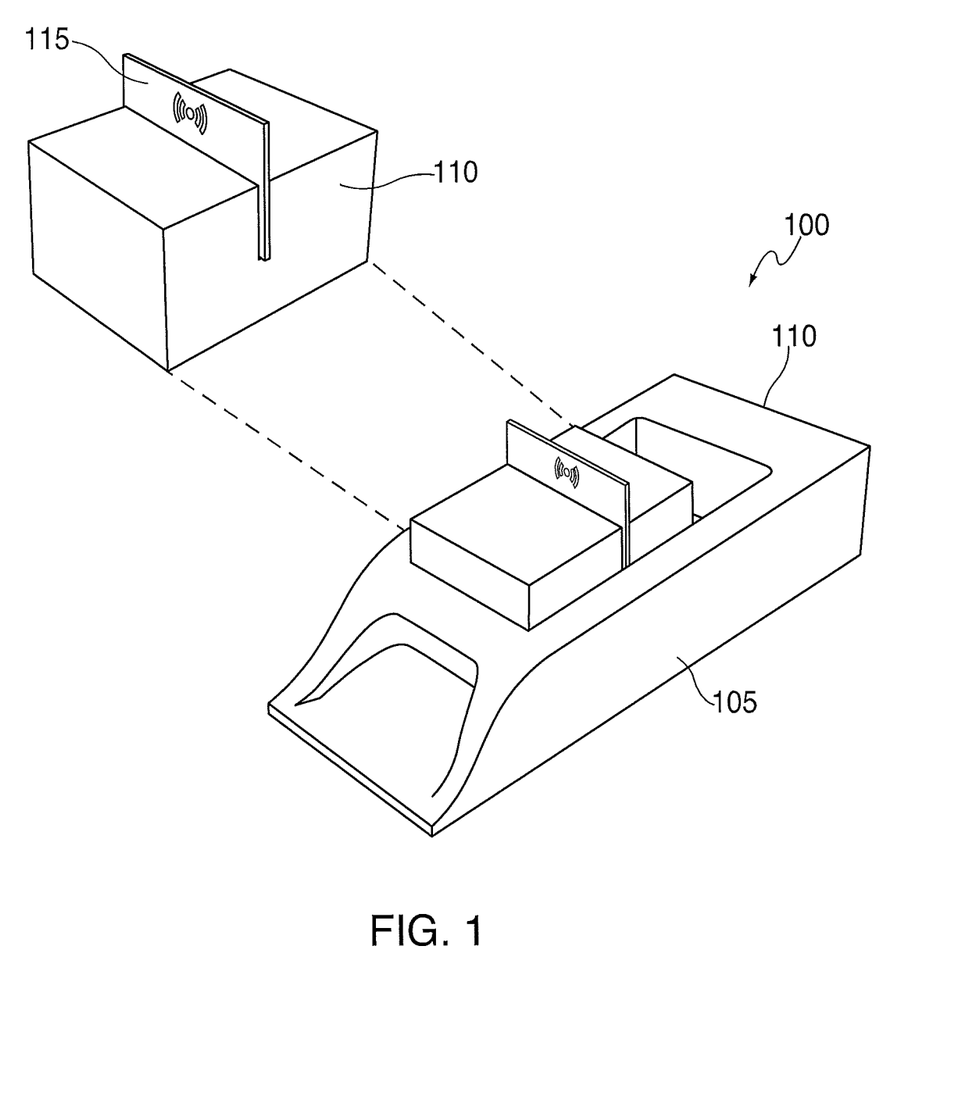
FIG. 1 is a perspective view of a playing card dealing shoe and deck of cards, with an example data card in accordance with one embodiment.

Referring to the drawings, FIG. 1 illustrates a playing card dealing system 100. This system 100 includes a playing card handling device 105 that contains a deck of playing cards 110. The playing card handling device 105 may be a dealing shoe in an example embodiment. For ease of reference, playing card handling device 105 will be referred to hereinafter as a shoe 105. In addition to illustrating the deck 110 in the shoe 105, FIG. 1 also illustrates the deck 110 exploded from the shoe 105. Deck 110 may be a standard fifty-two card deck. However, as shown, deck 110 is a superdeck comprised of eight standard decks for a total of 416 cards. Other deck sizes are also envisioned as per casino preferences.

As can best be seen in the exploded deck 110, the deck 110 may contain a data card 115. The data card 115 is preferably an electronic memory storage device, which is generated and used for a specific deck 110, as will be further discussed below. The data card 115 itself could be created from various technologies, including smart card technologies or the like. For example, a smart card with RFID technology would allow the data card 115 to be written or read without physical electrical connections. FIG. 1, for example, illustrates an embodiment in which the data card includes RFID technology. The data card 115 merely needs to be in proximity to a reader antenna on the shoe 105 for the shoe 105 to read the data card 115. Therefore, the data card 115 can be used as a cut card or the like. However, the data card 115 need not be associated with actual gameplay.

Wireless read/write functionality is optional. When the data card 115 is written, the card could be put into a fixture that provides electrical connectivity. Similarly, in the casino, the data card 115 could be physically inserted into a shoe 105 or another electronic device associated with the shoe 105, providing electrical connectivity (not shown in FIG. 1). Thus, any type of digital memory device or card could be used, as desired. Alternatively, the contents of the digital memory device could be communicated to the casino electronically, such as via the Internet. In such an embodiment, a physical data card may be avoided.

RFID technology has some advantages, though. The antenna-based coupling of RFID technology is more tolerant of mechanical misalignment than electrical contacts. For example, the data card 115 could be inserted into the shoe 105 in any possible orientation and still be successfully read. Another potential advantage is that an RFID-based data card 115 could be read (or written to) while the data card 115 remains within a factory-sealed box. This could allow for a casino process in which a deck 110 that still has a factory seal intact is loaded into a shoe 105.

There are various types of RFID technologies on the market, each of which have specific advantages and disadvantages as would be recognized in the art. For example, some technologies allow data rates of 106 Kbps. Given data size estimate of less than 4 KB, writing time would be short relative to an example 18 second manufacturing cycle time. Additionally, certain RFID technologies are fairly short in range. Although longer range RFID may have some benefits, shorter range RFID technologies are preferred to help prevent the shoe 105 of an adjacent table from accidentally reading a different table's data card 115. In order to help prevent shoe-to-shoe cross reading, the spacing between the data card 115 and the reader antenna of a shoe 105 should be low. In an example embodiment, the spacing between two shoes 105 ("D") is between about 10 and 100 times greater than the distance between the data card 115 and the reader antenna of the shoe 105 ("d"), such that D>>d.

Figure 2:
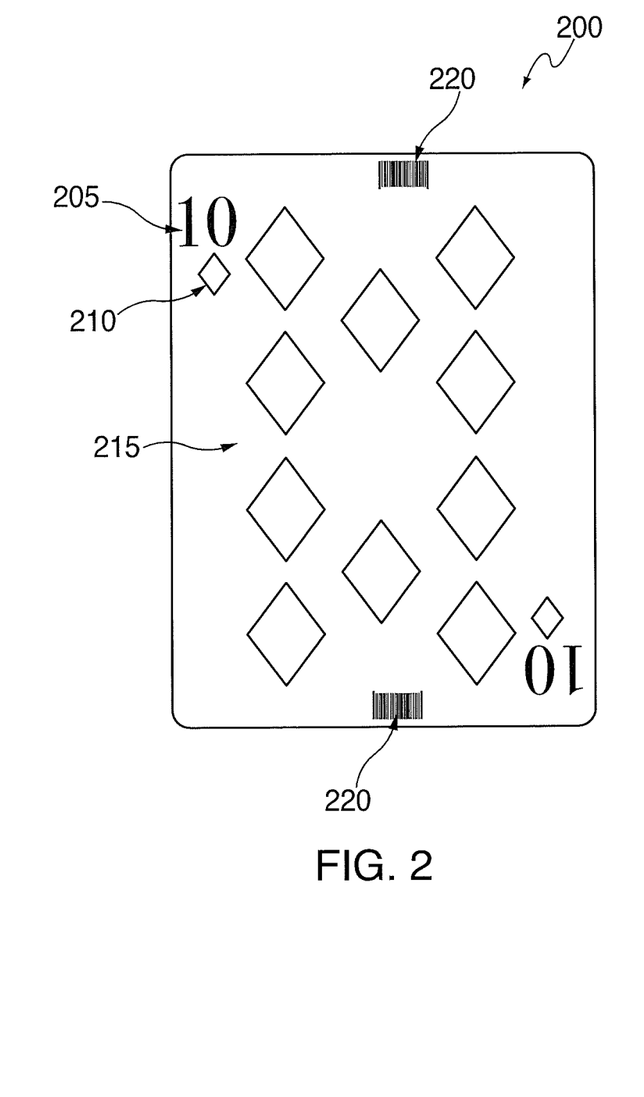
FIG. 2 is an example playing card showing one or more example position(s) for a data track thereon in accordance with one embodiment.

The deck 110 itself will now be discussed in additional detail in connection with FIG. 2. FIG. 2 illustrates a playing card 200. As with any standard playing card, playing card 200 includes an indicator of rank 205 and suit 210, along with a design 215 on the face of the card 200. However, playing card 200 also includes at least one data track 220. Multiple data tracks 220 may be used for redundancy. A data track 220 may include encoded information that is machine readable and identifiable.

U.S. Pat. No. 8,657,287 and related family (the disclosure of which is hereby incorporated by reference) disclose techniques for encoding rank and suit on a playing card, and then reading the encoded information from the playing card when the card is drawn from a shoe. However, a data track 220 in accordance with the teachings hereof may include additional information besides rank and suit information. For example, a random number is preferably included in a data track 220. This number, referred to herein as a serial number or "SN" is not related to the playing card suit or value. Preferably, a new random SN is generated for every playing card 200 upon creation.

A SN may, in an example embodiment, be a 32-bit number. The SN on each playing card preferably supports at least 1 billion unique values. A serial number of at least 30 bits is therefore preferred (for at least 1 billion values), but 32 bits is generally easier to implement in a digital memory system. Including the rank and suit generally entails an additional six bits (to account for 52 possibilities). Additional bits may also be included for error detection and/or correction, as well as lead-in or preamble bits.

The data track 220 may be one-dimensional (akin to a barcode), two-dimensional (as in U.S. Pat. No. 8,657,287 and related family), three-dimensional codes, or the like. A one-dimensional self-clocking data track 220 may also be used, such as via a Manchester encoding scheme, differential Manchester encoding, or Biphase Mark Code. Such a data track 220 could be printed on the top and/or bottom of a playing card 200 as shown in FIG. 2. One dimensional data tracks 220 are preferred because they allow for the use of a much simpler camera or sensor to detect the bits as they move past. In FIG. 2, the size of the data track 220 is exaggerated to better show the concept. The data tracks 220 may be much smaller so that the draw speed of the card is fairly constant over the length of the data read. When the data tracks 220 are small compared with the width of the card, the speed remains relatively consistent as the card is pulled.

A number of techniques for error detection and data correction could be used, as are known in the art. For example, CRC (cyclic redundancy check/correction) techniques calculated over the entire data track 220 could be used. Similarly, error correction codes exist that allow both detection and correction of one of more bit errors.

Preferably, the data track 220 is applied on the playing card 200. Such application may occur by printing with an ink, or laser etching, or the like. For example, a low visibility ink may be used, such as by using yellow (on a white background), infrared, or ultraviolet ink. Similarly, the data track 220 is preferably printed so as to be small while still achieving reliable detection. The height of a data track 220 is preferably tall enough to compensate for any misalignment and/or slop. Small data tracks 220 also help to preserve the visual aesthetic of playing card 200. Further, making the data track 220 hard to see or discern with the naked eye helps to obfuscate the encoded rank and suit of the card in the data track 220, if present.

Figure 3:
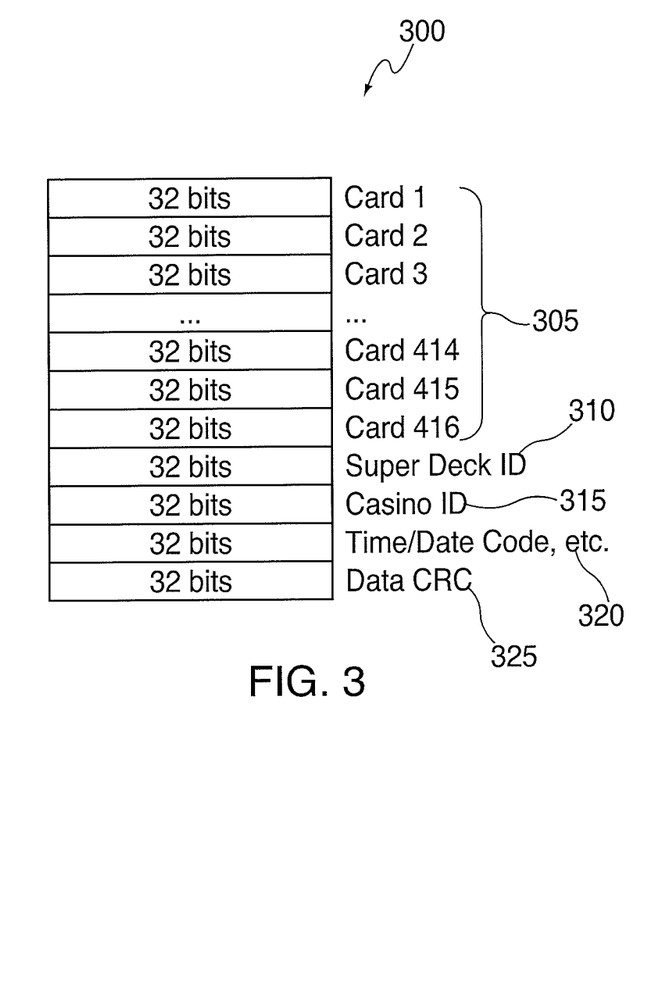
FIG. 3 is a chart showing an example set of data for inclusion on a data card in accordance with an example embodiment.

FIG. 3 illustrates example data content 300 of a data card 115. As each card 200 in the deck is assigned with a random SN, the data card 115 is loaded with the SN information of each card 200 in its associated deck 110 at the time of factory shuffling. Data card 115 therefore contains a list of the SNs of each card 200 and their order in the deck 110. FIG. 3 illustrates this sequence of SNs as numeral 305. In an example embodiment, the rank and suit information is also loaded into the data card 115, although in a preferred embodiment the rank and suit information is not loaded into the data card 115. In addition, a deck ID 310, a casino ID 315, a time/date code 320, and/or error detection/correction bits may also be added into the data card 115. In an example embodiment, the data card 115 may hold at least 1.64 KB of data, although 64 bit SNs would lead to a data card 115 that holds at least 3.28 KB of data.

A digital signature may also be included as an obstacle against counterfeiting. Other techniques include encryption and other security measures. With random SNs that are independent of the playing card face value, encryption of the SN data is less important because knowledge of the SNs would not give a player an advantage in the game. However, cryptography concepts may still be utilized in the data stored within a data card 115 and the shoe 105. For example, authentication provides the identification of a message originator. This could be used to validate that the data card 115 was created at a proper facility. A security service that can identify any alteration(s) in the message data may also be used. Encrypted data could also make it more difficult to hack the interface between a data card 115 and a shoe 105.

If no cryptography is used, data integrity of the data card 115 could be verified using simple CRC data 325 appended to the end of the data in the data card 115, as shown in FIG. 3. However, adding a digital signature to the data card 115 immediately adds capability for authentication and enhanced data integrity checks of the data card 115 data. In an example embodiment, a digital signature is generated by combining the SNs 305, deck ID 310, casino ID 315, time/date code 320, and CRC data 325 into a unique hashed message digest. This digest may then be passed, along with a private key, into a Digital Signature Algorithm (DSA) to generate a unique digital signature. The private key (Kpriv) would remain with the card manufacturer.

Later, when put into use, the casino could also then take the SNs 305, deck ID 310, casino ID 315, time/date code 320, and CRC data 325 and perform a hash operation to generate a digest. The casino would then use a corresponding public key and the same DSA to verify that the digital signature was created at an authorized facility. If the digital signature is valid and/or the CRC data is validated, the casino knows that the data in the data card 115 is legitimate.

Figure 4A:
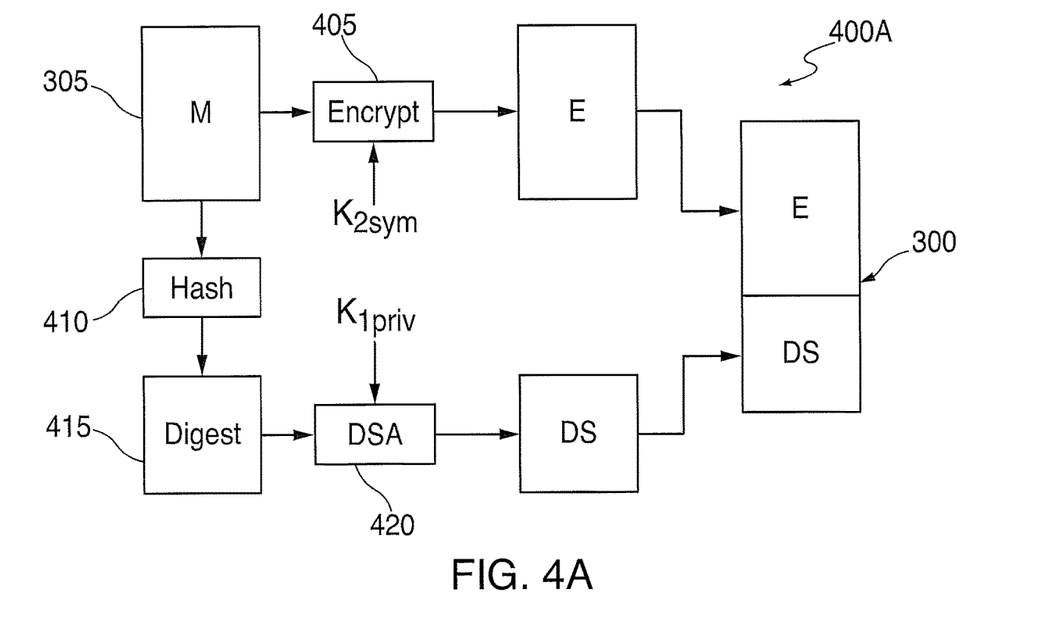
FIG. 4A is a flow diagram of an example method for encrypting data to be saved to a data card in an example embodiment.
Figure 4B:
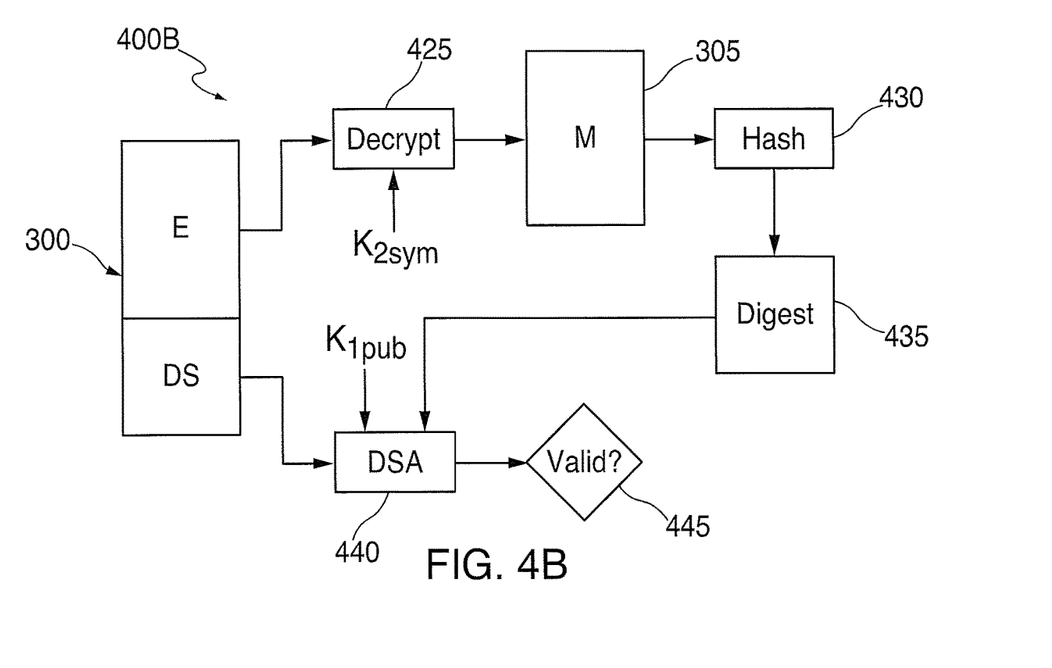
FIG. 4B is a flow diagram of an example method for decrypting data read from a data card in an example embodiment.

Encryption may also or alternatively be used to add confidentiality to the data card 115 data. It is possible to encrypt (at the factory) and decrypt (in the casino) the original plaintext message. In any example embodiment, this process could use a symmetric key to both encrypt and decrypt the message. This encryption would make it harder for hackers to generate their own data cards 115 because it would require knowledge of the symmetric key. The symmetric key (Ksym) known to the casino in the shoe would not be made available to the general public, and would need to be protected. FIGS. 4A and 4B illustrate example methods 400A and 400B for implementing digital signature and encryption/decryption techniques for the data 300 on a data card 115.

In FIG. 4A, the original plaintext message 305 (which, again, includes the SNs 305 and any deck ID 310, casino ID 315, time/date code 320, and CRC data 325) is designated "M." The original plaintext message 305 is sent to an encryption system 405 that uses a symmetric key "$K_{2sym}$" to encrypt the original plaintext message 305 into an encrypted plaintext message "E." The encrypted plaintext message E then becomes part of the data 300 on data card 115. The original plaintext message 305 is simultaneously sent to a hash function 410 to create a digest 415. Hash function 410 may be a one-way function that takes variable length data to create a fixed length output in the form of digest 415. Changing the input data in any way would change the output 415 of the hash function 410. The digest 415 is then sent to a Digital Signature Algorithm "DSA" that uses a private key "$K_{1priv}$" to create digital signature "DS." The digital signature is then added to the encrypted plaintext message E as data 300 on the data card 115.

In FIG. 4B, the data 300 on data card 315 is decrypted to validate the contents. The encrypted plaintext message E is sent to for decryption at 425 using the symmetric key "$K_{2sym}$" back into original plaintext message 305 ("M"). The original plaintext message 305 can then be passed again to a hash function 430 to create a digest 435. This digest 435, along with the digital certificate DS are passed to another Digital Signature Algorithm "DSA" 440 that uses a public key "$K_{1pubv}$" to validate the digital signature DS at step 445.

In another example embodiment, digital certificates and Public Key Infrastructure (PKI) may be used to authenticate both sides of a communication link. PKI utilizes a network connection to a Certificate Authority (CA), which is used during a handshake process to identify and verify the other end of a communication link. For example, the casino would communicate to a server to validate a deck ID 310. The casino would use PKI to create that communication connection. It will be understood that present and future encryption techniques are envisioned, including techniques not yet created.

Figure 5:
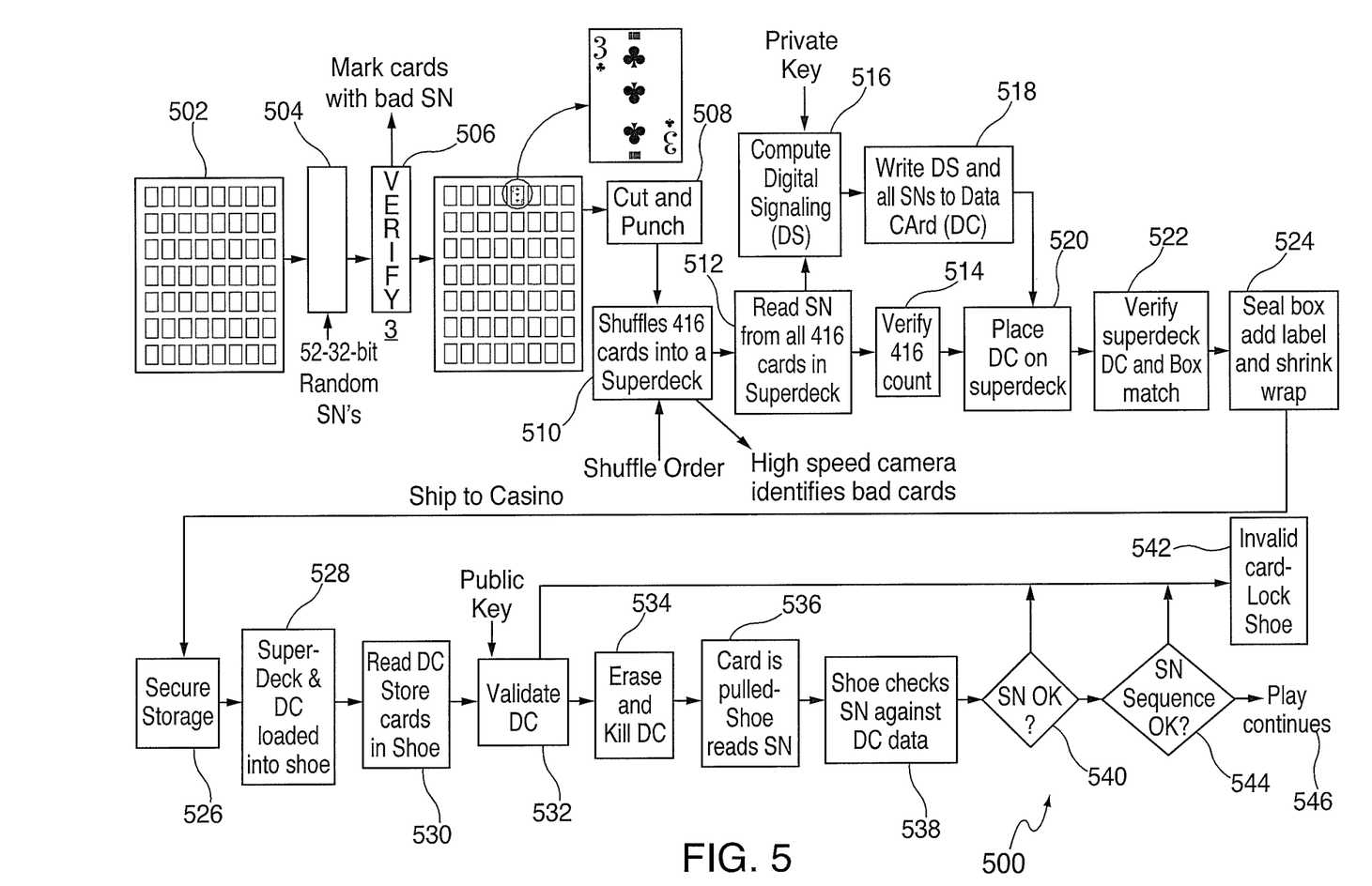
FIG. 5 is a flow diagram of an example method for creating and using playing cards and a data card in an example embodiment.

FIG. 5 illustrates a process 500 for validating playing cards according to an example embodiment. At step 502, a sheet if playing cards 200 is printed. At step 504, a random SNs is generated and assigned to each card 200, as discussed above. Each respective SN is printed on its respective card 200. At step 506, the SNs on the cards 200 are verified. Cards with bad SNs are rejected. At step 508, the cards 200 are cut and punched from the sheet. At step 510, the cards 200 are shuffled and collected into a deck 110. At this point, the cards 200 may again be checked for bad SNs, using a sensor. The sensor may, in an example embodiment, be a vision system such as a high speed camera, or a barcode scanner or the like. At step 512, the SNs from all cards in the deck are read, and at step 514 the number of cards in the deck is verified. Simultaneously, at step 516, the SN numbers and any other selected information are sent through a digital certificate and/or encryption system (e.g., a system operating method 400A above) if such a step is desired.

At step 518, a data card 115 is created containing the SNs and any other data as discussed above, either as encrypted data or otherwise as desired. At step 520, the data card 115 is placed with the deck 110, and at step 522 it is verified that the data card 115, deck 110, and box match. At step 524 the box is sealed, labeled, and shrink-wrapped with the data card 115 inside. At step 526, after shipping to the casino, the sealed box is stored securely. At step 528, the box is opened and the deck 110 and data card 115 are loaded into a device such as a dealing shoe 105. The shoe 105 reads the data card 115 at step 530, which effectively "activates" the deck 110 for play. The contents of the data card 115 are validated and/or unencrypted at step 532 (e.g., as shown above in method 400B). This validation step may occur within the shoe 105 if onboard processing is sufficient. Alternatively or in addition, the shoe 105 may be in communication with a casino server, and the casino server may perform any necessary processing steps. Once validated, at step 534, the shoe 105 erases the data card 115 to kill it. In an alternative embodiment where the data card 115 acts as the cut card and is inserted with the deck 110 into the shoe 105, the shoe 105 may detect the data card 115 at the effective end of the deck 110, and may deactivate the deck and/or data card 115 at that time.

At step 536, as a card 200 is pulled from the shoe 105, the SN is read in addition to any rank and suit information on the card 200. At step 538, the shoe 105 or casino server check the SN against the card SN and order data read from the data card 115. At step 540, if the SN itself contains bad data, an alert, alarm, or other signal is activated or the shoe locks at step 542 because of an invalid card. However, if the SN contains valid data, the process advances to step 544 at which point the shoe 105 or casino server determines whether the drawn card 200 is in the correct order. If not, the shoe 105 again locks at step 542 because of an invalid sequence. If the sequence is correct, play continues at step 546. By tracking each pulled card by SN, the cards 200 in the deck 110 may be "activated" for a single use or multiple uses as desired by the casino. The order of the playing cards 200 drawn from the shoe 105 may be captured and stored electronically. A casino may use such a digital record to resolve game disputes. Alternatively, a manufacturer of the deck 110 may utilize the digital record to audit or prove randomness of the playing cards 200.

From the foregoing, it will be seen that the various embodiments of the present invention are well adapted to attain all the objectives and advantages hereinabove set forth together with still other advantages which are obvious and which are inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required."

Many changes, modifications, variations and other uses and applications of the present constructions will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method comprising the steps of:
   placing a deck of playing cards in a playing card handling device, wherein each playing card in the deck is printed with a respective randomly generated number thereon, wherein a said card with a rank and suit has a different random number assigned than any other card in the deck with the same rank and suit, such that each said respective random number contains no indication of the rank or suit of its respective playing card;
   associating, with the deck in the playing card handling device, a data file containing each random number associated with each playing card in the playing card handling device, along with order information of an order in which each playing card appears in the deck;
   reading the random number printed on a said playing card as the playing card is drawn from the playing card handling device;
   determining whether drawn playing card is expected based on the random number read from the drawn playing card as compared to the order information stored in the data file;
   allowing play to continue normally when the drawn playing card is expected;
   signaling an alert when the drawn playing is not expected;
   wherein the playing card handling device is a dealing shoe;
   wherein association of the data file with the deck in the shoe occurs by inserting a data card containing the data file into the shoe;
   wherein the data card is plugged into the shoe, wherein physical contacts on the data card engage with physical contacts in the shoe to allow for electronic communication therebetween.

2. The method of claim 1 wherein the data file is received electronically from a manufacturer of the playing card.

3. The method of claim 1 wherein each random number is printed on its respective playing card in the form of a one-dimensional data track.

4. The method of claim 3 wherein a sensor in the shoe reads the data track on a playing card as the playing card is drawn from the shoe.

5. A method comprising the steps of:
placing a deck of playing cards in a playing card handling device, wherein each playing card in the deck is printed with a respective randomly generated number thereon, wherein a said card with a rank and suit has a different random number assigned than any other card in the deck with the same rank and suit, such that each said respective random number contains no indication of the rank or suit of its respective playing card;
associating, with the deck in the playing card handling device, a data file containing each random number associated with each playing card in the playing card handling device, along with order information of an order in which each playing card appears in the deck;
reading the random number printed on a said playing card as the playing card is drawn from the playing card handling device;
determining whether drawn playing card is expected based on the random number read from the drawn playing card as compared to the order information stored in the data file;
allowing play to continue normally when the drawn playing card is expected;
signaling an alert when the drawn playing is not expected;
wherein the playing card handling device is a dealing shoe;
wherein association of the data file with the deck in the shoe occurs by inserting a data card containing the data file into an electronic device associated with the shoe, wherein physical contacts on the data card engage with physical contacts of the electronic device to allow for electronic communication therebetween.

6. A system comprising:
a deck of playing cards, wherein a respective randomly generated number is applied on each said playing card in the deck, wherein a said card with a rank and suit has a different random number assigned than any other card in the deck with the same rank and suit, such that each said respective random number contains no indication of the rank or suit of its respective playing card;
an activation device containing a data file of each randomly generated number of the playing cards in the deck, and the order of each playing card in the deck
a playing card handling device for receiving the deck of cards therein, wherein the playing card handling device includes a sensor for detecting the randomly generated number on a said playing card as the said playing card is drawn from the playing card handling device; and
wherein the playing card handling device is associated with a processor, wherein said processor:
is in communication with the sensor and the activation device to receive information therefrom;
determines whether a playing card drawn from the playing card handling device is expected an expected playing card based on the information from the sensor and the activation device; and
disables the playing card handling device when the drawn playing card is not the expected playing card;
wherein the playing card handling device is a dealing shoe;
wherein the activation device is a data card packaged with the deck;
wherein the processor is further operable to delete the data file from the data card to deactivate the deck of playing cards.

7. The system of claim 6 wherein the data card includes at least one wireless communication component.

8. The system of claim 7 wherein the at least one wireless communication component is an RFID chip.

9. The system of claim 6 wherein the activation device is a server in communication with the processor for providing the processor with the information from the activation device.

10. The system of claim 6 wherein the processor is positioned within the shoe.

11. The system of claim 6 wherein the processor is remote from the shoe.

* * * * *